United States Patent [19]

Streit

[11] 4,067,527

[45] Jan. 10, 1978

[54] MUSICAL INSTRUMENT SUPPORT STAND WITH COUNTER-BALANCED, VERTICALLY MOVABLE HORN SUPPORT RACK

[76] Inventor: James L. Streit, Rte. 3, Box 364, Vernon, Tex. 76384

[21] Appl. No.: 639,184

[22] Filed: Dec. 9, 1975

[51] Int. Cl.² .......................................... F16M 13/00
[52] U.S. Cl. ...................................... 248/125; 84/453
[58] Field of Search .......................... 84/453; 297/186; 248/121, 122, 123, 124, 125, 280, 281, 291

[56] References Cited

U.S. PATENT DOCUMENTS

| | | | |
|---|---|---|---|
| 316,459 | 4/1885 | How | 248/280 |
| 806,790 | 12/1905 | Foersterling | 248/281 |
| 1,285,025 | 11/1918 | Burns | 248/280 |
| 1,319,792 | 10/1919 | Phorson | 248/123 X |
| 1,570,168 | 1/1926 | Mortensen | 248/124 |
| 1,646,165 | 10/1927 | Navjoks et al. | 248/291 X |
| 1,653,772 | 12/1927 | Knoche | 248/122 |
| 2,171,028 | 8/1939 | Gelb | 248/123 |
| 2,693,015 | 11/1954 | Richards et al. | 248/229 X |
| 2,803,417 | 8/1957 | Gruber | 248/229 X |
| 3,850,398 | 11/1974 | Kantor | 248/291 X |

FOREIGN PATENT DOCUMENTS 562,676  12/1957  Belgium .............................. 248/123

Primary Examiner—William H. Schultz
Attorney, Agent, or Firm—Wayland D. Keith

[57] ABSTRACT

A combination support stand and support rack for a heavy and cumbersome musical instrument, such as a Sousaphone or a tuba. The rack is adjustable arcuately, vertically and laterally to hold the instrument in playing position, and is especially desirable for use by children who are learning to play such instruments, but who are physically unable to handle them.

Provision is made to maintain both the stand and the rack in adjusted position so it may be brought back to the same position without further adjustment, when the player leaves the instrument and then returns to resume playing. A counterbalanced parallelogram mechanism provides means by which the instrument is easily raised with a minimum of effort while the player is seated, so that the rack may be moved out of the way when the player wishes to leave the seated, playing position, and is easily returned so the rack and the instrument will be in the same adjusted position, when the player returns to the seated, playing position.

6 Claims, 12 Drawing Figures

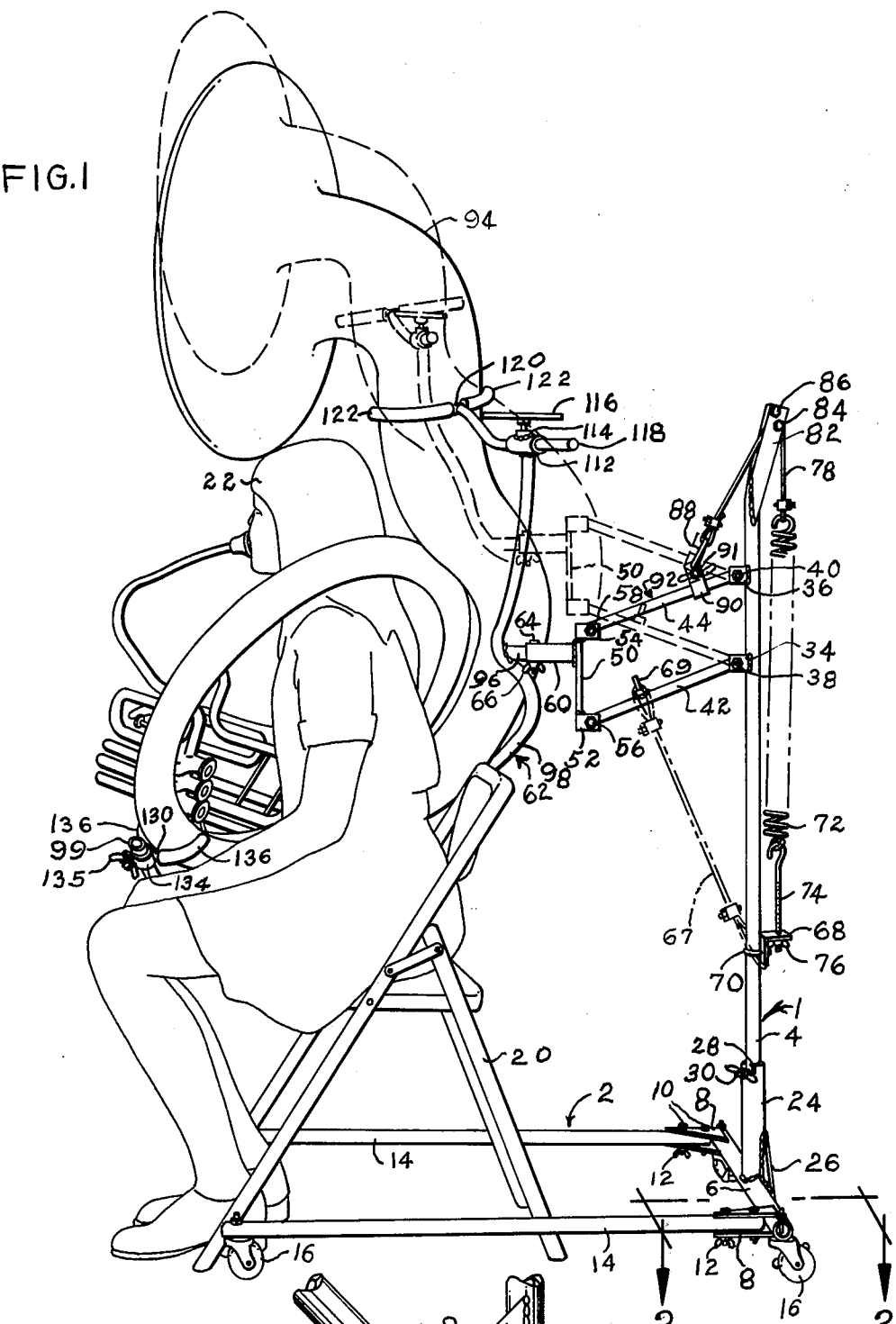
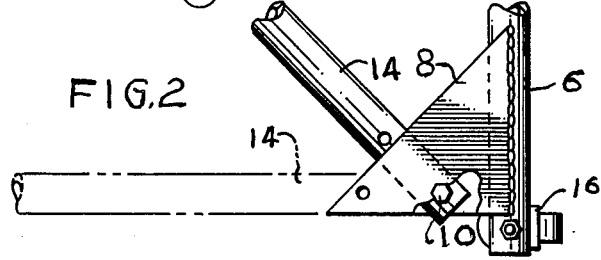

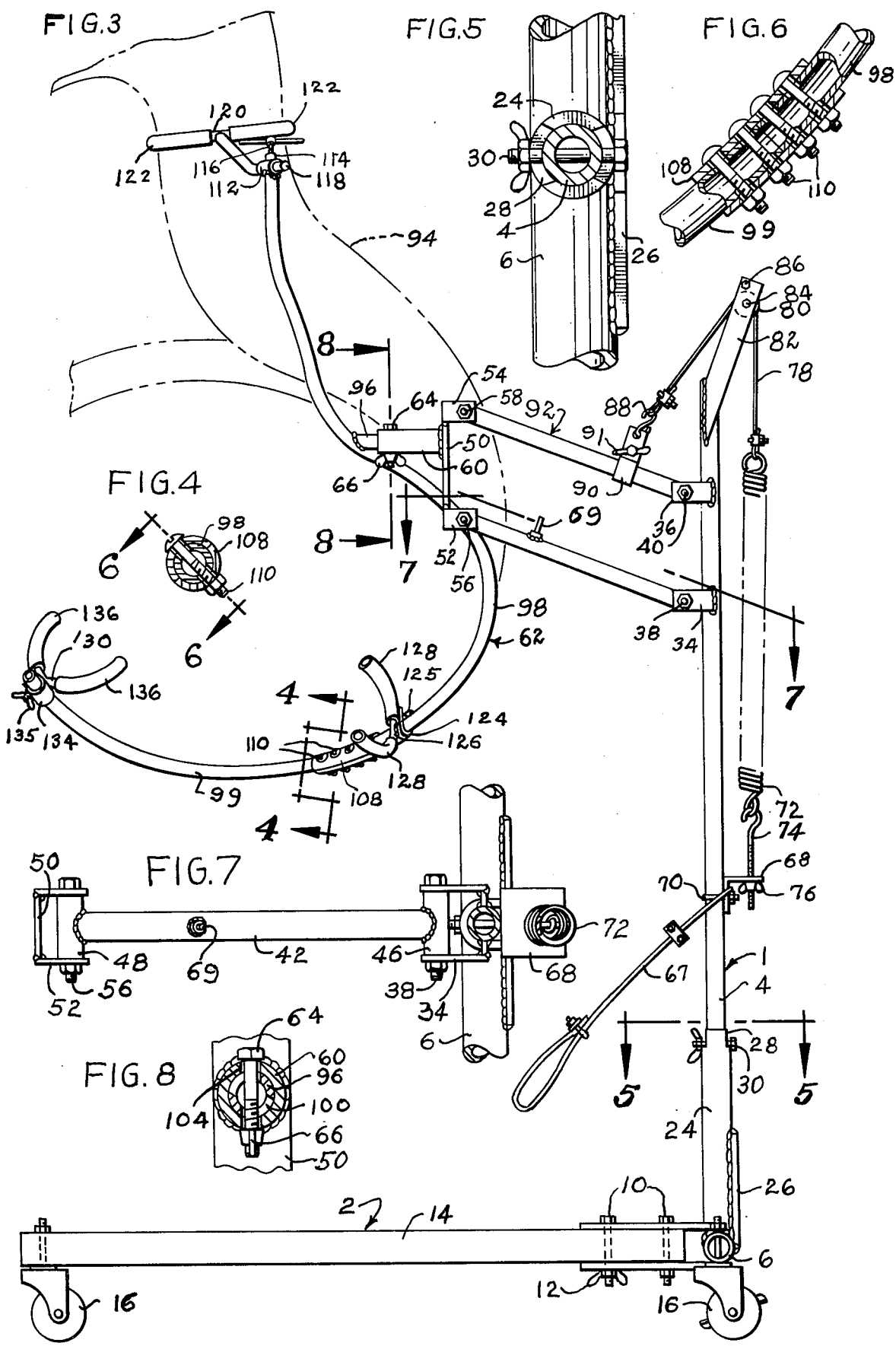

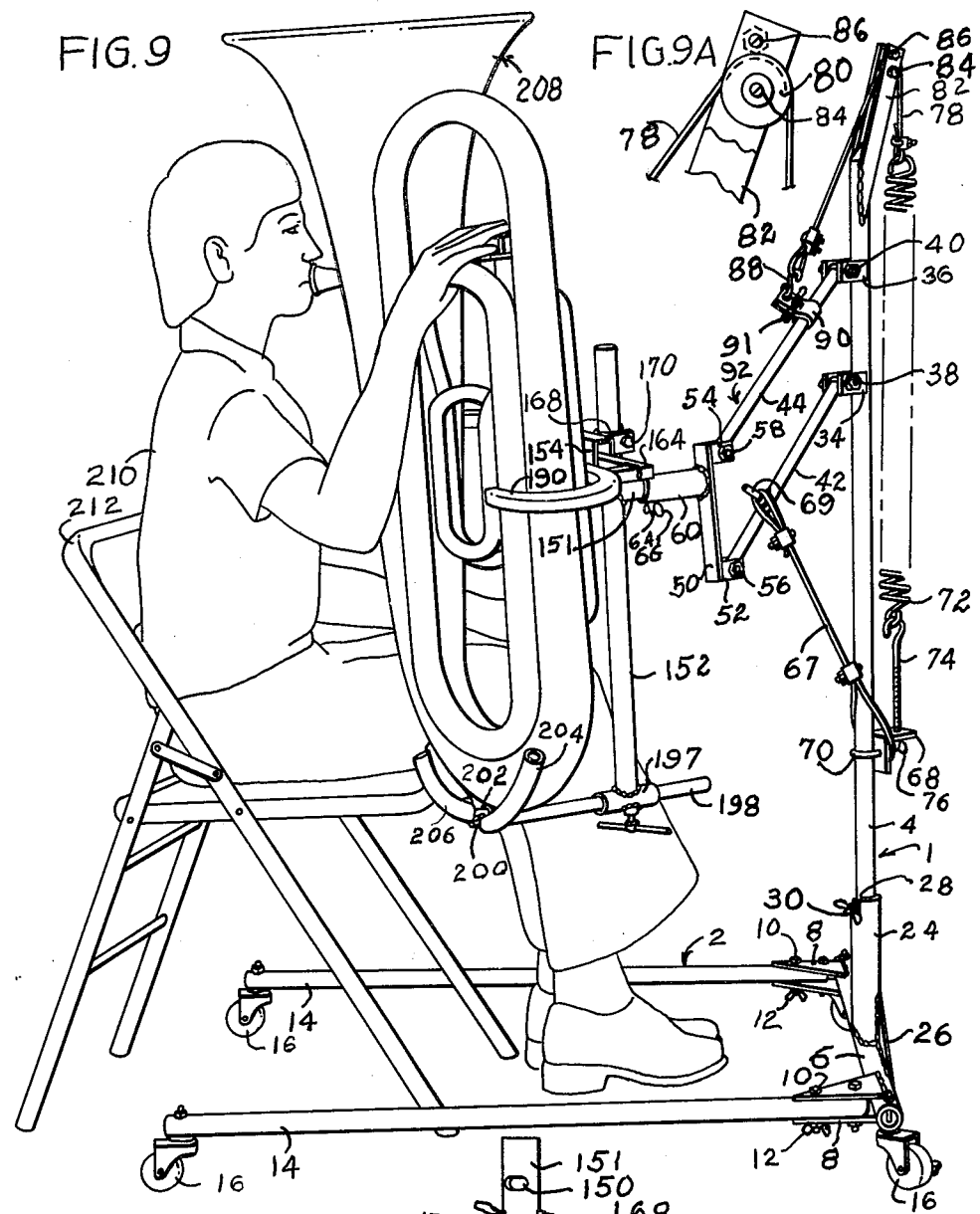
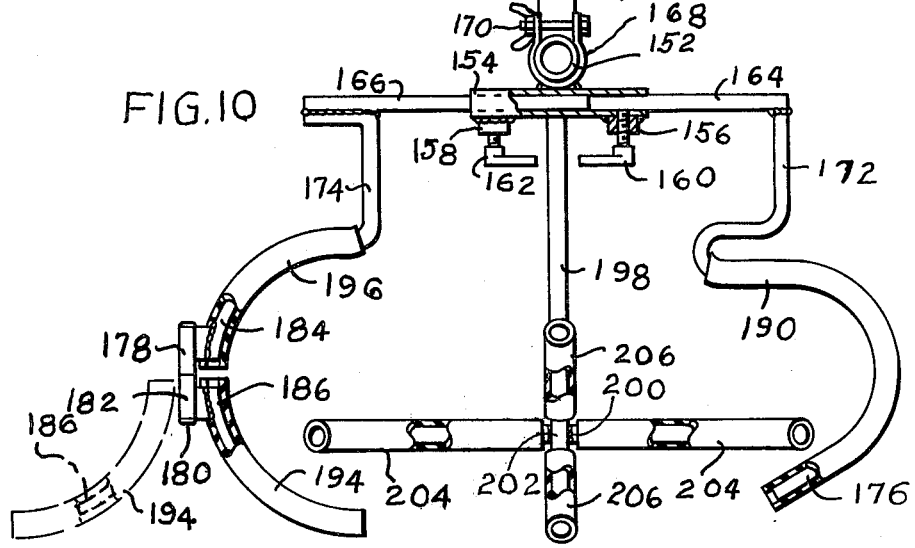

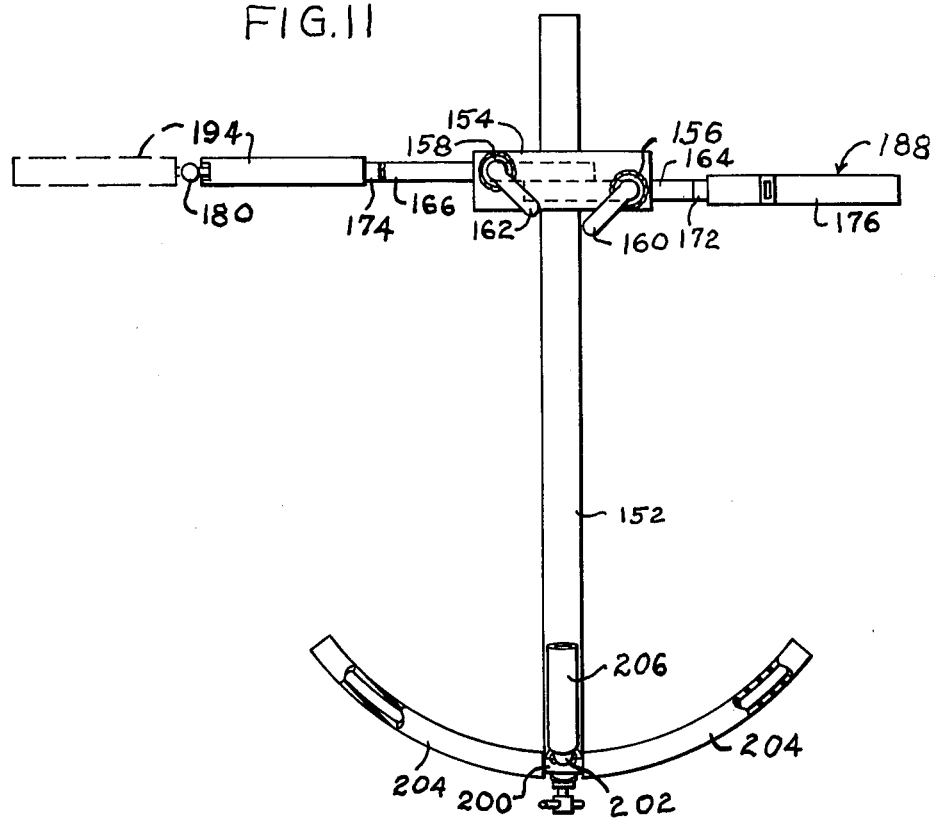

MUSICAL INSTRUMENT SUPPORT STAND WITH COUNTER-BALANCED, VERTICALLY MOVABLE HORN SUPPORT RACK

SUMMARY OF THE INVENTION

This application is co-pending with application Ser. No. 482,352, filed June 24, 1974 now abandoned for Musical Instrument Support Stand, and relates to an improvement in horn stands and more particularly to a portable stand for a Sousaphone, tuba or the like, which would be difficult for a small musician to handle.

The present horn stand is so constructed as to enable ready disassembly of certain parts in a minimum of time, and the collapse of other parts so the stand will require a minimum of space during transportation and/or storage.

The horn receiving portion of the present stand provides adjustments, so that once adjusted to receive a horn in a given position while being played, the horn stand will receive the horn, such as a Sousaphone, tuba or the like by the instrument being laid upon the stand without the of clamps or bolts to secure the horn to the stand. The horn stand may be provided with a horn receiving rack which to receive a Sousaphone or the like, but which rack may be quickly removed, by the removal of a wing nut bolt and a rack to receive a horn of another type, such as a tuba, substituted therefor, the bolt reinserted and the wing nut tightened to hold the horn rack in place. The horn rack is mounted on a parallel mechanism to enable the horn to be raised or lowered in a vertical plane, while maintaining the horn in the same relative position with respect to the horn stand. The horn and the horn receiving rack are adjustably counterbalanced so horns of different weight may be placed on the rack and the manipulation thereof be done by a child, with a minimum of physical effort. Furthermore, provision is made to hold the horn in a lowered position to enable the horn and horn rack to be changed at the lower level, and then, when the change has been made, the counterbalancing parallelogram mechanism may be released and the rack with the horn thereon adjusted to the desired level.

The horn may be adjusted axially about an upright standard as well as adjusted to the angularity of the horn with respect to the horn rack support member.

The horn rack may be readily disassembled and certain parts thereof may be folded together to minimize the space required for transportation and/or storage. The horn rack is so adjusted and counterbalanced that it may be adjusted to a position that a musician seated in a chair can be in position to use the instrument, the horn may also be adjusted to the level required by a particular musician to enable him to perform on the horn, regardless of his size. When ready to leave the chair, the musician may swing the horn rack mechanism, upon which the horn is resting, upwardly to enable the musician to disengage himself from the horn without having to bend or twist the body to get out of the playing position. The same is true when the musician again resumes his seat to play the horn. After the musician is reseated, the mechanism supporting the horn, such as a Sousaphone, may be moved downward to move the Sousaphone around the body to the playing position, which will enable even a small child to use the instrument and to change the position thereof.

When the horn rack mechanism is to be changed to a rack to accommodate a different type horn, such as a tuba, it is necessary only to remove a bolt having a wing nut thereon, and remove a horizontal tubular member of the Sousaphone rack from the socket which supports this rack on the horn raising and lowering mechanism and a tubular portion of the tuba horn support rack fitted into the socket on the horn raising and lowering mechanism, the bolt reinserted thereinto and the rack clamped to a particular adjusted angle by the wing nut on the bolt, as desired. When once adjusted, the tuba may be removed and replaced by hinging one arcuate member into place to maintain the tuba in stable adjusted position. The counterbalancing of the horn and the horn rack and horn movement mechanism may be adjusted in two ways, a screw threaded J-bolt, which is attached to a counterbalancing spring will give a range of fine adjustments with respect to the weight of the horn used, further, a clamp is secured to one of the bars of the parallelogram mechanism, which clamp may be moved along one of the bars of the parallelogram mechanism to vary the leverage of the spring on the lever of the parallelogram mechanism.

PRIOR ART

The applicant is aware of the following patents, which have been considered, both individually and in combination and it is believed that claims directed to the present structure define over the patents as listed below:

U.S. Pat. No. 1,319,792, Phorson, Oct. 28, 1919;
U.S. Pat. No. 1,570,168, Mortensen, Jan. 19, 1926;
U.S. Pat. No. 1,653,772, Knoche, Dec. 27, 1927;
U.S. Pat. No. 2,171,028, Gelb, Aug. 29, 1939;
U.S. Pat. No. 563,676, Belgian, June 3, 1960.

OBJECTS OF THE INVENTION

An object of this invention is to provide an adjustable, demountable, counterbalanced, collapsible horn stand for supporting a heavy horn, so the horn may be brought into playing position after the player is seated, and the horn, such as a Sousaphone, removed from around the body while the player is still seated, and without having to twist or distort the body to get out of the horn which encompasses the body.

Another object of the invention is to provide a horn support stand, which stand may be adjusted to accommodate various type horns, and which will stay in adjusted position once the adjustments are made, which adjustments may be made in a minimum of time.

A further object of the invention is to provide a horn support stand on which the position of the horn may be adjusted to a particular angle, both laterally and vertically for the comfort and convenience of the individual playing the instrument.

Still another object of the invention is to provide counterbalancing arrangement by which even a small child can raise and lower a heavy horn, such as a Sousaphone, while in a sitting position.

Yet another object of the invention is to provide a demountable horn support stand, which stand may be disassembled without the use of tools.

Still a further object of the invention is to provide a horn supporting rack which may be changed to accomodate different type horns, which portions of the rack may be readily interchanged on the support stand.

Another object of the invention is to provide an upstanding horn stand which is mounted on casters to allow ready movement of the stand.

Still a further object of the invention is to provide an upstanding horn stand which is mounted on casters to allow ready movement thereof with the horn mounted thereon, so that the horn and stand may be rolled, as a unit, from room to room, without the necessity of removing the horn therefrom or changing the adjustments thereof.

BRIEF DESCRIPTION OF THE DRAWINGS

In the Drawing

FIG. 1 is a perspective view of a horn support stand, with a support rack for a Sousaphone mounted thereon, a musician is shown in full outline in playing position, the Sousaphone support rack with a Sousaphone thereon being shown in raised position in dashed outline;

FIG. 2 is a fragmentary view taken on the line 2—2 of FIG. 1, looking in the direction indicated by the arrows, with parts broken away and with parts shown in dot-dash outline, in alternate positions;

FIG. 3 is a side elevational view of the horn support stand with a Sousaphone support rack mounted thereon, being shown in full outline, and showing a portion of the Sousaphone positioned on the rack in dot-dash outline;

FIG. 4 is a sectional view taken on the line 4—4 of FIG. 3, looking in the direction indicated by the arrows, showing the manner of clamping the two portions of the horn support rack together;

FIG. 5 is a sectional view taken on the line 5—5 of FIG. 3, looking in the direction indicated by the arrows, showing a fragmentary portion of a horn support stand on an enlarged scale, showing a swing bolt positioned therethrough to clamp the upright member to the base portion, and showing arcuate recesses to enable the swinging of the upright standard and the horn rack about the vertical axis of the upright standard to obtain proper adjustment;

FIG. 6 is an enlarged, fragmentary sectional view taken on the line 6—6 of FIG. 4, looking in the direction indicated by the arrows, showing the clamping arrangement for joining the two portions of the horn support rack together;

FIG. 7 is an enlarged, fragmentary sectional view taken on the line 7—7 of FIG. 3, looking in the direction indicated by the arrows, to show the manner in which the parellogram support bars are pivotally attached between the upright standard and the horn rack;

FIG. 8 is an enlarged, fragmentary sectional view taken on the line 8—8 of FIG. 3, looking in the direction indicated by the arrows, showing a tubular support member on the upright standard and a tubular connection on the horn rack, and showing arcuate slots within the tubular member on the horn rack to enable the horn rack to be adjusted about the axis thereof and secured in place by the wing nut on the bolt;

FIG. 9 is a perspective view of the horn support stand with a tuba support rack pivotally mounted thereon, and showing a bolt, having a wing nut thereon, passing through a hole in an outstanding tube on the horn support rack and through arcuate slots on a tubular member attached to the horn rack, and showing a tuba horn mounted on the horn support rack, with the musician seated in playing position, which support stand, horn support rack, horn and seated player are shown in full outline;

FIG. 9A is an enlarged fragmentary view of the upper portion of the horn support stand, with portions being broken away and shown in section to show a sheave mounted thereon with a flexible element, such as a cable, therein, and showing a bolt passing through a portion of the upright standard to retain the cable within the sheave;

FIG. 10 is a plan view of the tuba support rack, shown apart from the stand with parts being broken away and with parts shown in section and in dashed outline to show to show alternate positions of the tuba support rack;

FIG. 11 is an elevational view of the tuba support rack as shown in FIG. 10, with parts broken away and with parts shown in section, and with hidden parts shown in dotted outline, to show the laterally adjustable features of the tuba support rack, with a portion of the tuba support rack being shown in dashed outline to show the manner by which the rack may be moved to enable the tuba to be removed from the rack with a minimum of vertical lifting.

DETAILED DESCRIPTION

With more detailed reference to the drawings, in which like reference characters designate like parts in the several views thereof, the numeral 1 designates generally a horn support stand, which support stand is used with both forms of the invention, and comprises a base designated generally at 2 and an upright standard which standard is tubular as shown in FIG. 5, and is designated generally by the numeral 4.

The base 2 has a transverse tubular member 6, to which member 6 a pair of plates 8 is 8 is secured, near each end thereof, as by welding, which plates have spaced apart apertures formed therein, which apertures in the respective plates receive bolts 10 therethrough, at least one of which bolts 10 on each side, has a wing nut 12 thereon to enable the bolt to be removed. The 10 pass outwardly and extend through tubular support member 14. The base 2 is provided with a caster wheel 16 at each corner thereof. The base comprising tubular support member 14 and transverse member 6 form a substantially a U-shaped member 2 in which a chair, designated at 20, may be placed and on which the player of the horn may be seated.

An upright socket 24 is mounted mediate the ends of transverse tubular member 6 and is braced by gusset 26. The socket 24 has a recess 28 formed therein on each opposite side thereof each to receive a bolt 30 which bolt also passes through the upright standard and is so positioned between the slots as to give limited arcuate movement of upright standard 4 about an upright axis. The upright standard 4 has pairs of spaced apart, apertured lugs 34 and 36 respectively secured thereto, as by welding, each pair of which lugs is spaced apart transversely, as will best be seen in FIG. 7, to receive pivot bolts 38 and 40, respectively, therethrough and through a pair a parallelogram arms 42 and 44, respectively, which arms each have a tubular member, such as indicated at 46, secured thereto so that the arms 42 and 44 will be stabilized against lateral movement with respect to bolts 38 and 40.

The opposite end of each arm 42 and 44 has a tubular member, such as shown at 48, secured thereto. An upright support bar 50 has pairs of vertically spaced apart, apertured lugs 52 and 54, respectively, secured thereto to receive bolts 56 and 58 therethrough. The upright spacing of the bolts 56 and 58 is the same as that of bolts 38 and 40, so that an apertured tubular horn support member 60, secured to the upright support bar 50, extends outward therefrom at substantially a right angle to complementally engage apertured tubular member 96 on the horn support rack 62, to enable a horn support rack 62, as shown in FIG. 3. to be readily attached thereto or to be removed therefrom by removal of the bolt 64, which bolt has a wing nut 66 thereon. The bolt and wing nut form fastening means.

The upright support standard 4 has an apertured angle bracket 68 secured thereto by U-bolt 70 forms a clamp to enable the vertical adjustment of the bracket 68 on upright support standard 4 to enable different tension to be exerted on spring 72, which spring 72 is attached to an adjustable spring engaging element such as a J-bolt 74 at one end. The J-bolt 74 passes through the aperture in angle bracket clamp 68 and has a wing nut 76 thereon to enable further adjustment of the spring 72. The spring 72 has a cable 78 secured thereto at the upper end thereof, which cable passes over a sheave 80, which sheave is journaled between a pair of spaced apart, upwardly extending, apertured bracket members 82, which are mounted on the upper end of standard 4, through which apertures an axial member 84 is positioned to rotatably mount the sheave 80. The cable 78 is retained in the sheave by a bolt 86 which is positioned near the outer periphery of the sheave 80. The cable 78 passes over the sheave 80 and is detachably connected to a hook-like member 88, which member 88 connects with an apertured clamp 90, which clamp 90 is held in adjusted, fixed relation to tubular member 44 by a wing nut adjustment bolt 10 91 forming an anchor means. The clamp 90 may be moved along the tubular member 44 of the parallelogram mechanism, designated generally at 92, to enable the correct tension on the spring 72 as is necessary to lift the horn support rack 62 and the horn 94 mounted thereon.

Sousaphone Horn Supporting Rack

The form of the invention as shown in FIGS. 1, 3 and 6, shows a Sousaphone horn support rack, which has a tubular member 96 secured to a deformed tubular member 98, as by welding, which tubular member 96 has diametrically spaced, complementary, arcuate slots 100 formed therein, which slots receive a bolt 64 therethrough and through apertures 104 formed in tubular horn support member 60, as will best be seen in FIGS. 3 and 8. The bolt 64 has a wing nut 66 thereon which enables the ready removal, replacement and tightening of the bolt to hold the deformed tubular member 98 in adjusted, fixed relation. Due to the length of the deformed tubular member 98, a deformed tubular member 99 is secured thereto as by apertured, segmental clamp 108, through the apertures of which the bolts 110 pass and through complementary apertures in the adjacent ends of deformed tubular members 98 and 99, thereby enabling the deformed tubular members to be knocked down for shipmemt or for storage.

The upper end of the deformed tubular member 98 has a substantially horizontally arranged tubular member 112 secured thereto transversely thereof, as by welding. The tubular member 112 has a screw threaded boss 114 thereon to receive a quick detachable wing screw 116 therein to bindingly engage an outwardly extending arm 118 in adjusted relation, both arcuately and longitudinally with respect to the transverse, horizontally arranged tubular member 112.

A U-shaped tubular yoke member 120 is secured to outstanding arm 118, as by welding, and has cushion members, such as rubber tubing 122 sleeved thereover so as to cradle a portion of the Sousaphone therein, to avoid marring the surface of the instrument and to minimize noise when the two surfaces come in contact. The deformed tubular member 98 extends downwardly and has a U-shaped clamp 124 clamped therearound in binding, adjusted relation by a bolt 125 so that the U-shaped yoke 126, which is secured to the clamp 124 as by welding, may be adjusted to support a portion of the Sousaphone when laid thereon. A rubber tubing 128, or tubing of other soft material, is fitted on the outwardly extending U-portions of the U-shaped yoke 126 so as to support the Sousaphone without marring the surface of the instrument and to minimize noise.

A third U-shaped support bracket 130 is secured to a U-shaped clamp 134 which sleeve has a winged set screw 135 thereon. The U-shaped clamp 134 is slidable over the deformed tubular member 99 and has tubing 136, of soft material such as rubber or the like, thereon, to cradle the Sousaphone within the U-shaped members, when these are properly adjusted, so the Sousaphone may be laid in the U-shaped members 120, 126 and 130, when properly adjusted, and the Sousaphone may be lifted from and replaced onto the U-shaped members, and be in the original adjusted position, without the use of tools. When the Sousaphone support stand is to be used again, the Sousaphone may be placed within the U-shaped members and the parallelogram mechanism, designated generally at 92, swung into place after the player has assumed a playing position in a chair, or the Sousaphone may be lifted upwardly, so as not to interfere with the player when he leaves the chair.

The basic horn support stand 1 accommodates a rack, designated generally at 62, for a Sousaphone as shown in FIGS. 1, 3 and 6. However, it is so constructed that the rack 62 may be detached from the support stand 1 by the removal of wing nut 66 from bolt 64 and removing the horizontally arranged tubular member from the tubular horn support member 60, whereupon, a horn of different size and style may be readily placed on the basic stand 1.

A strap or cable 67, as shown in dot-dash outline in FIG. 1 may be provided to engage bracket 68 on support stand 1 and a projection 69 on parallelogram mechanism 92 to hold the Sousaphone against upward movement, or the cable may be released from the projection 69 to enable the Sousaphone to be raised.

TUBA HORN SUPPORTING RACK

A tuba horn support rack, as shown in FIGS. 9, 10 and 11, has a horizontal tubular member 151, which member 151 extends into tubular socket 60 of the horn support stand 1, in the same manner as the aforementioned and described Sousaphone horn rack. The horizontal tubular member 151 has opposed arcuate slots 150 formed therein, as is also true for the Sousaphone rack, to permit the passage of bolt 64 therethrough to enable the arcuate adjustment of the rack about the axis of tubular member 151, which tubular member 151 is held in fixed relation to the outwardly extending tubular horn support member 60. The horizontal tubular support member 151 is secured to an upright tubular support member 152, as by welding, as will best be seen in FIG. 9. The upright tubular support member 152 has a transverse tubular member 154, which is rectangular in cross section, as will best be seen in FIGS. 9, 10, and 11, which transverse tubular member 154 has screw threaded bosses 156 and 158 thereon to receive winged set screws 160 and 162 respectively therethrough to bindingly engage transversely adjustable, squared bar members 164 and 166, the purpose of which will be brought out more fully hereinafter.

The transverse, rectangular in cross-section, tubular member 154 has a U-shaped clamp 168 secured to a side thereof, as by welding, which U-shaped clamp encompasses the upright tubular support member 152 to enable the clamp 168 to be adjusted both longitudinally within the length of the upright support member 152 and arcuately with respect to the axis thereof. The clamp 168 is held in adjusted, fixed relation by a bolt and wing nut 170.

The outer ends of the respective transverse, squared bar members 164 and 166 each has a bar 172 and 174, respectively, secured thereto, which bars extend laterally outward in the same direction. The outer end of the bar 172 is curved, as indicated at 176, as will best be seen in FIG. 10, and is of a configuration to receive a portion of the tuba horn. The bar 174 has a hinge portion 178 attached thereto by means of a hinge pin 180 extending therethrough, and through a complementary hinge portion 182 to join the arcuately curved bars 184 and 186 in hingeable relation, so, when the position shown in full outline in FIG. 10 is assumed, it will cradle a side of the tuba horn in opposed relation to the curved portion 176. A curved portion 186, which is hingeably connected with the curved portion 184 may be moved to the position indicated in dashed outline in FIG. 10, to enable the tuba horn to be moved into the rack designated generally at 188, without having to lift the tuba horn above the inwardly curved portion 176 and the curved portions 184 and 186, thereby enabling a small child to remove the tuba horn from the rack 188 and to replace the horn thereinto. The curved portion 176 is covered by a soft cushioning material 190, such as rubber or the like. With opposed curved portions 184 and 186 are also covered with soft material, such as rubber tubing 196 and 194, respectively this prevents damage to the surface of the horn and minimizes noise.

The lower end of upright tubular support member 152 has a transverse tubular member 197 secured thereto to slidably receive a tubular member 198 which extends outwardly in the same direction as the bars 172 and 174. The outwardly extending tubular member 198 has a U-shaped member 200 secured thereto transversely thereof, the ends of which U-shaped member curve upwardly.

A second U-shaped member 202 is secured to the U-shaped member 200 and has the ends thereof curved upwardly and positioned at a right angle to the U-shaped member 200 so as to cradle the lower end of the tuba. The U-shaped member 200 has a soft covering 204, such as tubular hose segments, and U-shaped tubular member 202 has a covering of soft material thereon, as indicated at 206, such as rubber tubing, so as to nest the lower end of the tuba horn in seated relation, once the curved portions 176, 184 and 186 are adjusted in proper relation to the tuba horn by sliding the bars 164 and 166 inward and clamping these bars in place by set screw wing nuts 160 and 162.

Once the various adjustments are made, the tuba horn may be placed between the curved portions, as indicated in FIG. 9, and the parallelogram mechanism 92 will enable the tuba horn, designated generally at 208, to be brought into playing position with respect to the musician, indicated at 210, seated in the chair 212, as seen in FIG. 9. The horn support stand, designated at 1, permits all the adjustments to be made as set out and described above for the Sousaphone.

A strap or cable 67 may be provided to engage bracket 68 on support stand 1 and an outwardly extending projection 69 on the parallelogram mechanism 92 to hold the tuba horn against upward movement, as indicated in FIG. 9, or the cable may be released from the projection 69 to enable the parallelogram mechanism to move upward, as shown in FIG. 3.

What is claimed is:
1. A musical instrument support stand, which stand comprises;
   a. a bifurcated base,
      1. a transverse member forming a portion of said bifurcated base,
      2. an outwardly extending member pivotally mounted on said transverse member near each outer end thereof for pivotal movement with respect thereto and forming the bifurcations of said base,
   b. an upright standard mounted on said base,
      1. said upright standard being detachably secured to said transverse member forming a portion of said base,
   c. a parallelogram mechanism pivotally mounted on said upright standard, the axes of which pivots are parallel,
      1. spaced apart parallel bars extending outwardly from said upright standard in the same direction, near the upper end thereof,
      2. an upright bar pivotally mounted on the opposite ends of said parallel bars, the pivotal axes of said bars being parallel with the pivotal axes on said upright standard,
      3. the axes of said upright bar being spaced apart a distance equal to the spacing of said first mentioned axes on said upright standard,
   d. an apertured member secured on said upright bar, which apertured member extends laterally outward away from said upright standard,
   e. a horn rack comprising a deformed tubular member to receive and support the horn thereon,
      1. a laterally extending, apertured member secured to said horn rack and extending outwardly to complementally engage said apertured member on said upright bar.
2. A musical instrument support stand as defined in claim 1; wherein
   a. said horn rack has a deformed tubular member of a configuration to under-lie the greater portion of a musical instrument to support the instrument resting thereon solely thereby.
3. A musical instrument support stand as defined in claim 2; wherein
   a. U-shaped yoke members are mounted on said deformed tubular member and are positioned at intervals throughout the length thereof to support an instrument against lateral movement with respect to said deformed tubular member.
4. A musical instrument support stand, as defined in claim 3; wherein
   a. said yokes are adjustable with respect to said deformed tubular member,
      1. clamp means are attached to each said yoke and surrounding said deformed tubular member,
      2. screw means engages said clamp means to hold said respective U-shaped members in adjusted relation with respect to said deformed tubular member, 3. a further yoke means is fitted on said deformed tubular member, near the upper end thereof, and is adjustable transversely and arcuately with respect thereto, 4. screw threaded means threadably engaging said screw threaded means on said deformed tubular member and interengaging said further yoke means to hold said further yoke means in adjusted relation so as to form a horn support.

5. A musical support stand as defined in claim 1; wherein a. at least two transversely arranged, deformed tubular members form substantially U-shaped yokes secured near the outer end of the said outwardly extending bar on the lower end of said upright tubular support member to form a seat for the horn, b. a transverse tubular member is positioned near the upper end of said upright support member and is substantially at a right angle to said transverse tubular member on the lower end of said upright support member, 1. a clamp member is secured to said transverse tubular member and surrounds said upright support member, 2. bolt means adjustably securing said clamp member to said upright support member, c. at least one longitudinally adjustable bar within said upper transverse tubular member, 1. at least one inwardly facing yoke on the outer end of at least one said bar to support the sides of the horn, when the horn is seated on said yokes, near the lower end of said upright support bar, 2. screw threaded means in said tubular member, 3. screws threadably engaging said screw threaded means to engage at least one said longitudinally slidable bar to hold at least one slidable bar with an inwardly facing U-shaped member in adjusted relation about the horn, d. hingeable means on at least one said U-shaped member to move a portion of said U-shaped member from around the horn to permit lateral movement of the horn from the rack.

6. A musical instrument support stand, which stand comprises;

a. a bifurcated base, b. an upright standard mounted on said base, 1. said upright standard having an apertured angle bracket mounted thereon, intermediate the length thereof, and forming a portion of a clamp, 2. a U-bolt partially surrounding said upright standard and engaging said apertured angle bracket to form the other portion of the clamp, which clamp holds said bracket in adjusted, fixed relation with respect to said upright standard, 3. apertured bracket members mounted on the upper end of said upright standard, 4. a sheave journaled between said bracket members, 5. a spring engaging adjustment bolt secured to said apertured angle bracket clamp on said upright standard, 6. a spring engaged with said adjustment bolt and extending upwardly, 7. a cable secured to the upper end of said spring and extending upward over said sheave and between said apertured bracket members, c. a pair of spaced apart, horizontally disposed pivot members on said upright standard, near the upper end thereof, the axes of which pivot members are parallel, 1. spaced apart, parallel bars, one pivotally connected to each said pivot member and extending therefrom in the same direction, 2. an adjustable clamp mounted on, and secured to one of said outwardly extending parallel bars, 3. said cable extending downward from said sheave and being anchored to said adjustable clamp, 4. an upright bar pivotally mounted on the opposite ends of said parallel bars, the axes of said pivot mountings on said upright bar being spaced apart a distance equal to the spacing of said first mentioned pivot members on said upright standard, said upright standard, said parallel bars and said upright bar forming a parallelogram mechanism, d. an apertured tubular member secured on said upright bar, which apertured, tubular member extends laterally outward therefrom, e. a horn rack comprising a deformed tubular member, which member underlies the horn, which horn is supported thereby, 1. an apertured tubular horn rack support member being secured to said horn rack and extending laterally inward to complementally engage said apertured tubular member on said upright bar, 2. a bolt extending through said aperture in said tubular horn support member and through said complementally apertured tubular member on said upright bar so as to maintain said horn in an adjusted position, f. said spring attached to said cable being adapted to support at least a portion of the weight of the horn rack with the horn thereon, when said spring is in tensioned condition.

* * * * *